United States Patent [19]

Turner

[11] Patent Number: 5,199,835
[45] Date of Patent: Apr. 6, 1993

[54] BOLT TENSION INDICATOR

[76] Inventor: Arthur M. Turner, Beeley Hill Top, Matlock, Derbyshire DE4 2NW, England

[21] Appl. No.: 888,844

[22] Filed: May 27, 1992

[30] Foreign Application Priority Data

Jun. 13, 1991 [GB] United Kingdom ............... 9112785

[51] Int. Cl.⁵ .................... F16B 31/02; G01L 5/00
[52] U.S. Cl. ................................. 411/11; 411/14; 73/761; 116/212; 116/DIG. 34
[58] Field of Search ................... 411/9–11, 411/13, 14; 73/761; 116/212, DIG. 34

[56] References Cited

U.S. PATENT DOCUMENTS

| | | | |
|---|---|---|---|
| 2,850,937 | 9/1958 | Ralston | 411/11 |
| 4,131,050 | 12/1978 | Holmes | 411/10 |
| 4,303,001 | 12/1981 | Trungold | 411/10 |
| 4,483,648 | 11/1984 | Trungold | 411/10 |
| 4,500,237 | 2/1985 | Pliml, Jr. | 411/11 |

Primary Examiner—Neill R. Wilson
Attorney, Agent, or Firm—Larson and Taylor

[57] ABSTRACT

A bolt tension indicator having an annular washer part of concave cross section for fitment beneath the head of a bolt or beneath a nut, the indicator being made of spring steel and having at least one projecting tab element continuous with the annular washer part so that the lying flat of the tab element against a clamping face indicates a tension in the bolt.

4 Claims, 1 Drawing Sheet

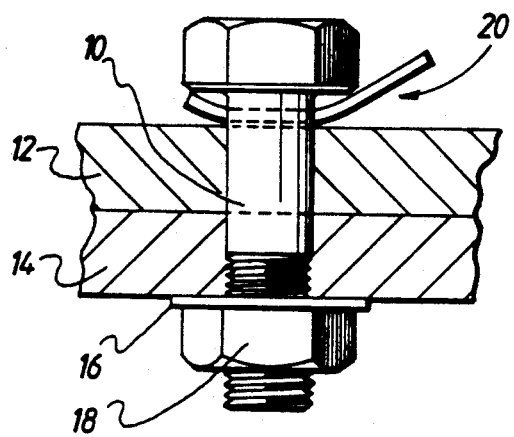
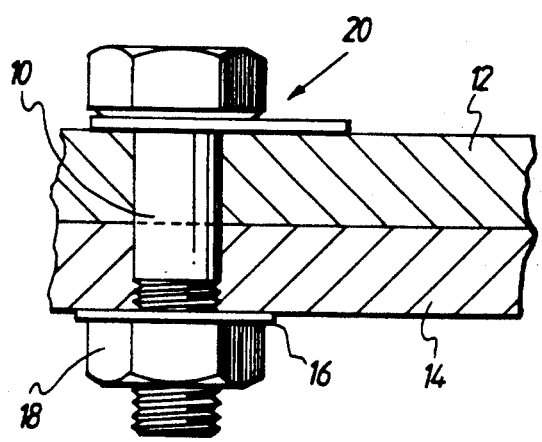
FIG.1    FIG.2
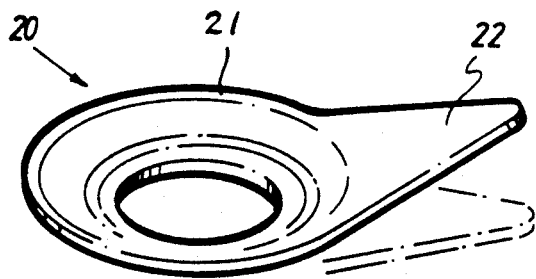
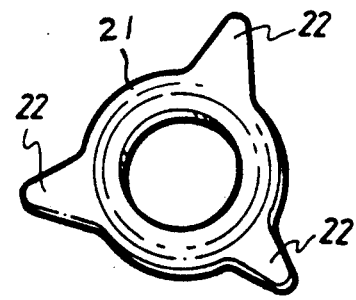
FIG.3    FIG.4

BOLT TENSION INDICATOR

FIELD OF THE INVENTION

The invention relates to a bolt tension indicator.

Various devices exist for indicating the attainment of a correct tension in a bolted fastening which is being tightened. For example, it is known to provide a pre-load indicating washer having a plain portion and a plurality of integral raised portions pressed or otherwise deformed out of the plain portion at circumferentially spaced intervals thereof and being yieldable plastically to permit re-deformation thereof back into substantially the plain portion of the washer, the number of the raised portions and their size being such that the re-deformation of said portions back into substantially the plain portion of the washer under the clamping pressure of an associated bolt or other fastener will indicate a required tension in said fastener. Alternatively, a well known type of bolt or nut may be used, the bolt or nut being provided with a number of separate projections extending from a clamping face of the bolt head or of the nut, as the case may be, the arrangement being such that on the attainment of the proper clamping pressure portions of the bolt head or nut adjacent said projections are caused to yield plastically.

Devices of the kind described above generally work quite well but none exist which can clearly indicate that the tension in the fastening in which the indicator is used has subsequently become reduced.

Accordingly, it is an object of the invention to provide a bolt tension indicator which can clearly indicate that the tension in the fastening has subsequently been reduced.

It is a further object of the invention to provide an indicator by means of which the bolted fastenings of a structure can be checked for tightness by means of a quick and easy visual check of the bolt tension indicators used in the fastenings.

In accordance with the present invention there is provided a bolt tension indicator made of spring steel and comprising an annular washer part having at its periphery at least one projecting tab element, the annular washer part in its free condition having a concave cross section so that said at least one tab element, continuous with the radially outermost part of the washer, projects at an angle to the general plane of the washer, and whereby, when used in a bolted connection, the lying flat of the at least one tab element against a clamping face indicates a tension in the fastening and any subsequent movement of the at least one tab element away from said clamping face indicates a reduced tension in the fastening. At least a part of the indicator may be coloured to facilitate tension checking when in use.

Also in accordance with the invention, there is provided a bolted connection including a bolt tension indicator as described above, the indicator having been located adjacent a clamping face of a structural member being clamped so that, before tightening of the fastening, the at least one tab element of the indicator projects away from said clamping face and so that, after tightening of the fastening, the at least one tab element lies flat against said clamping face.

BRIEF DESCRIPTION OF THE DRAWINGS

FIG. 1 is an axial section through a loosely assembled bolted connection including a bolt tension indicator embodying the invention, FIG. 2 is a view similar to FIG. 1 but showing the connection after it has been tightened, FIG. 3 is a perspective view of the bolt tension indicator, and FIG. 4 is a view similar to FIG. 3 and illustrating a slightly different form of indicator.

DESCRIPTION OF THE PREFERRED EMBODIMENT

Referring now to FIG. 1 of the drawings, the bolted connection there illustrated includes a bolt 10 extending through structural steel members 12 and 14. A screwthreaded end length of the bolt is provided with a plain washer 16 and with a nut 18.

Beneath the head of the bolt and spacing the underside of the head from the surface of the member 12 is a bolt tension indicator, generally indicated 20, made of spring steel. As shown in FIG. 3, the bolt tension indicator, in its free condition, has an annular washer part 21 the cross section of which is concave. At one side the washer is provided with a projecting tab element 22 continuous with the radially outermost part of the washer so that in the unstressed condition of the washer, as shown in FIG. 3, the tab element projects at an angle to the general plane of the washer.

Referring now to FIG. 2, when the bolted connection has been tightened, the bolt tension indicator has been deformed by the clamping pressure so that its previously concave annular washer part has become a washer of flat form. As a consequence of this, the tab element 22, which previously projected at an angle to the general plane of the washer, now projects in that same general plane so that there is no longer a space between it and the surface of the member against which the indicator abuts.

It will be understood that if the fastening subsequently works loose, so that the tension in the bolt is reduced, the bolt tension indicator will clearly indicate this fact; the annular washer part 21 will revert once more to a concave form to at least some extent and the extremity of the tab element 22 will consequently move away from the surface of the member against which the annular portion of the indicator abuts.

Thus there is provided a bolt tension indicator which will be of particular use in the construction industry for example. The bolted fastenings of a structure can be checked for tightness from time to time by a quick and easy visual check on the positions of the tab elements of the respective bolt tension indicators.

MODIFICATIONS OF THE PREFERRED EMBODIMENT

Various modifications may be made. For example, in FIG. 4 there is illustrated a bolt tension indicator similar to that of FIG. 3 except for the fact that it is provided with three equally spaced tab elements 22. In use it will be installed beneath the head of a bolt (or beneath a nut) in the manner illustrated in FIG. 1 so that any slackening of the connection will be indicated by the extremeties of the tab elements moving away from the surface against which the annular part 21 of the indicator abuts.

Other modifications may be made. For example, the or each tab element could be painted red (or of course some other colour) to facilitate tension checking.

Bolt tension indicators as described above may be supplied in a range of thicknesses to suit the degree of tension which will be required in an associated fastening.

I claim:

1. A bolt tension indicator made of spring steel and comprising an annular washer part having at its periphery at least one tab element projecting radially outwards, the annular washer part in its free condition having a concave cross section so that said at least one tab element, continuous with the radially outermost part of the washer, projects at an angle to the general plane of the washer, such that, when a proper tension is applied thereto in a bolted connection, the one tab element lies flat against a clamping face to indicate a proper tension in the fastening and the at least one tab element moves away from said clamping face upon a reduced tension in the fastening to so indicate said reduced tension.

2. A bolted connection including a bolt tension indicator according to claim 1, the indicator having been located adjacent a clamping face of a structural member being clamped so that, before tightening of the fastening, only the annular washer part of the indicator contacts the clamping face and, after tightening of the fastening, the at least one tab element lies flat against said clamping face in a common flat plane with the annular washer part of the indicator.

3. A bolt tension indicator according to claim 1, in which at least a part of the indicator is painted with colour to facilitate tension checking when in use.

4. A bolted connection including a bolt tension indicator according to claim 3, the indicator having been located adjacent a clamping face of a structural member being clamped so that, before tightening of the fastening, only the annular washer part of the indicator contacts the clamping face and, after tightening of the fastening, the at least one tab element lies flat against said clamping face in a common flat plane with the annular washer part of the indicator.

* * * * *